(12) United States Patent
Yamazaki (10) Patent No.: US 7,599,810 B2
(45) Date of Patent: Oct. 6, 2009

(54) POSITION DETECTING CIRCUIT AND APPARATUS USING THE SAME

(75) Inventor: Susumu Yamazaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/018,961

(22) Filed: Jan. 24, 2008

(65) Prior Publication Data
US 2008/0177500 A1 Jul. 24, 2008

(30) Foreign Application Priority Data
Jan. 24, 2007 (JP) .............................. 2007-013269

(51) Int. Cl.
*G01C 17/38* (2006.01)
(52) U.S. Cl. ....................................................... 702/94
(58) Field of Classification Search ................... 702/94, 702/95, 150
See application file for complete search history.

(56) References Cited

U.S. PATENT DOCUMENTS 7,132,824 B2 * 11/2006 Masuda et al. ......... 324/207.12

FOREIGN PATENT DOCUMENTS

JP 07181557 A 7/1995

* cited by examiner

*Primary Examiner*—Drew A Dunn
*Assistant Examiner*—Stephen J Cherry
(74) *Attorney, Agent, or Firm*—Westerman, Hattori, Daniels & Adrian, LLP.

(57) ABSTRACT

A position detecting circuit including: a plurality of magnetic field detecting devices discretely disposed for outputting a signal corresponding to a magnetic field strength produced by an oppositely disposed magnetic field generation means; a correction parameter arithmetic section for computing correction parameters for bringing to a predetermined constant value a sum of output from one of the magnetic field detecting devices and an output from another of the magnetic field detecting devices; and a position arithmetic section for computing and outputting a relative position between the magnetic field generation means and the magnetic field detecting devices based on an output difference the between the output from the one magnetic field detecting device and output from the another magnetic field detecting device and the correction parameters.

7 Claims, 7 Drawing Sheets

POSITION DETECTING CIRCUIT AND APPARATUS USING THE SAME

This application claims benefit of Japanese Patent Application No. 2007-13269 filed in Japan on Jan. 24, 2007, the contents of which are incorporated by this reference.

BACKGROUND OF THE INVENTION

The present invention relates to position detecting circuit for detecting relative position between objects, and relates to apparatus using the position detecting circuit.

Because of their relatively low cost, sensor systems using a permanent magnet and Hall effect device (magnetic field detecting device) are widely used as the system for detecting relative position between objects. In such a case, since Hall effect device possesses a temperature characteristic, there is a problem that sensitivity of the Hall effect device is changed and its position detecting accuracy is lowered with change in the ambient temperature. To solve this problem, Japanese Patent Application Laid-Open hei-7-181557 discloses a temperature correction means composed of a transistor having a temperature characteristic of an opposite polarity from the temperature characteristic of the Hall effect device, and a voltage dividing resistor and regulating resistor so that an electric current through a drive power supply of the Hall effect device is changed in accordance with the temperature change.

SUMMARY OF THE INVENTION

In accordance with a first aspect of the invention, there is provided a position detecting circuit including: a plurality of magnetic field detecting devices discretely disposed for outputting a signal corresponding to a magnetic field strength produced by an oppositely disposed magnetic field generation means; a correction parameter arithmetic section for computing correction parameters for bringing to a predetermined constant value a sum of an output from one of the magnetic field detecting devices and an output from another of the magnetic field detecting devices; and a position arithmetic section for computing and outputting a relative position between the magnetic field generation means and the magnetic field detecting devices based on an output difference between the output from the one magnetic field detecting device and the output from the another magnetic field detecting device and the correction parameters.

A first to fourth embodiments are the embodiments complying with the first aspect. It should be noted that the magnetic field generation means in the first aspect corresponds to a permanent magnet in the embodiments, the magnetic field detecting device to Hall effect device, the correction parameter arithmetic section to a summing amplifier and integrating circuit, and the position arithmetic section to a gain regulator and subtracting amplifier, respectively.

With thus constructed position detecting circuit, a relative position between the magnetic field generation means and the magnetic field detecting devices is computed and outputted based on output difference between output from one magnetic field detecting device and output from another magnetic field detecting device, and correction parameters for bringing the sum of output from the one magnetic field detecting device and output from the another magnetic field change detecting device to a predetermined constant value.

In a second aspect of the invention, the position arithmetic section in the position detecting circuit according to the first aspect includes a first gain regulator for applying a gain corresponding to the correction parameters to the output from the one magnetic field detecting device, a second gain regulator for applying the gain corresponding to the correction parameters to the output from the another magnetic field detecting device, and a subtracting amplifier for computing a difference between each output of the first and the second gain regulators and outputting it as a signal representing the relative position. The correction parameter arithmetic section computes the correction parameters so as to bring a sum of the outputs from each of the first and the second gain regulators to the predetermined constant value.

The first and third embodiments are the embodiments complying with the second aspect. With thus constructed position detecting circuit, gains corresponding to the correction parameters are applied to the respective outputs from one magnetic field detecting device and the another magnetic field detecting device. The difference is then computed between each output respectively from the one magnetic field detecting device and the another magnetic field detecting device to which the gains are applied, and it is outputted as signal representing relative position. Here, the correction parameters are computed so as to bring to a predetermined constant value the sum of the respective outputs from the one magnetic field detecting device and the other magnetic field detecting device to which the gains are applied.

In a third aspect of the invention, the position arithmetic section in the position detecting circuit according to the first aspect includes a subtracting amplifier for computing the output difference, and a gain regulator for applying a gain corresponding to the correction parameters to an output from the subtracting amplifier.

The second and fourth embodiments are the embodiments complying with the third aspect. In thus constructed position detecting circuit, an output difference is computed between the output from one magnetic field detecting device and the output from the another magnetic field detecting device. The gain corresponding to the correction parameters is then applied to the output difference so as to compute and output the relative position between the magnetic field generation means and the magnetic field detecting devices.

In a fourth aspect of the invention, the position detecting circuit according to the first aspect further includes A/D converter for converting each output from the one and the another magnetic field detecting devices respectively into digital signals, and the position arithmetic section and the correction parameter arithmetic section respectively execute an arithmetic operation on an output from the A/D converter.

The third and fourth embodiments are the embodiments complying with the fourth aspect. In thus constructed position detecting circuit, the outputs from the one and the another magnetic field detecting devices are respectively converted into digital signals, and arithmetic operations by the position arithmetic section and the correction parameter arithmetic section are executed on these digital signals.

In a fifth aspect of the invention, there is provided a microscope including: a lens barrel for retaining objective lens; a support arm for supporting the lens barrel so as to be movable; a regulating section for regulating a position of the lens barrel in relation to the support arm; a magnetic field generation means for generating a magnetic field attached to one of the lens barrel or the support arm; and a position detecting circuit according to the first aspect disposed on a side face of the other of the lens barrel or the support arm opposite the magnetic field generation means.

A fifth embodiment is the embodiment complying with the fifth aspect. With thus constructed microscope, the relative position between the lens barrel and the support arm is computed and outputted.

In a sixth aspect of the invention, there is provided a shake correction apparatus of an imaging apparatus including: a movable retaining section for retaining one or the other of a taking lens or an imaging device for converting an object image entered through the taking lens into electrical signals in a manner movable in relation to a main body of the imaging apparatus; a magnetic field generation means for generating a magnetic field attached to one of the movable retaining section or a member fixed to the main body; the position detecting circuit according to the first aspect disposed on a side face of the other of the movable retaining section or the member fixed to the main body opposite the magnetic field generation means; a shake amount measuring means for measuring an amount of shake of the main body; and a movement control means for moving the movable retaining section so as to compensate for the amount of shake based on an output from the position arithmetic section.

A sixth embodiment is the embodiment complying with the sixth aspect. It should be noted that the movable retaining section in this aspect corresponds to a movable base in the embodiment, the magnetic field generation means to a permanent magnet, the shake amount measuring means to a gyro sensor, and the moving amount control means to a movement control section.

In thus constructed shake correction apparatus of imaging apparatus, the movable retaining section is moved so as to compensate for the amount of shake of the main body based on the output from the position arithmetic section.

DESCRIPTION OF THE PREFERRED EMBODIMENTS

Some embodiments of the position detecting circuit according to the invention and of apparatus to which the same is applied will be described below with reference to the drawings.

Figure 1:
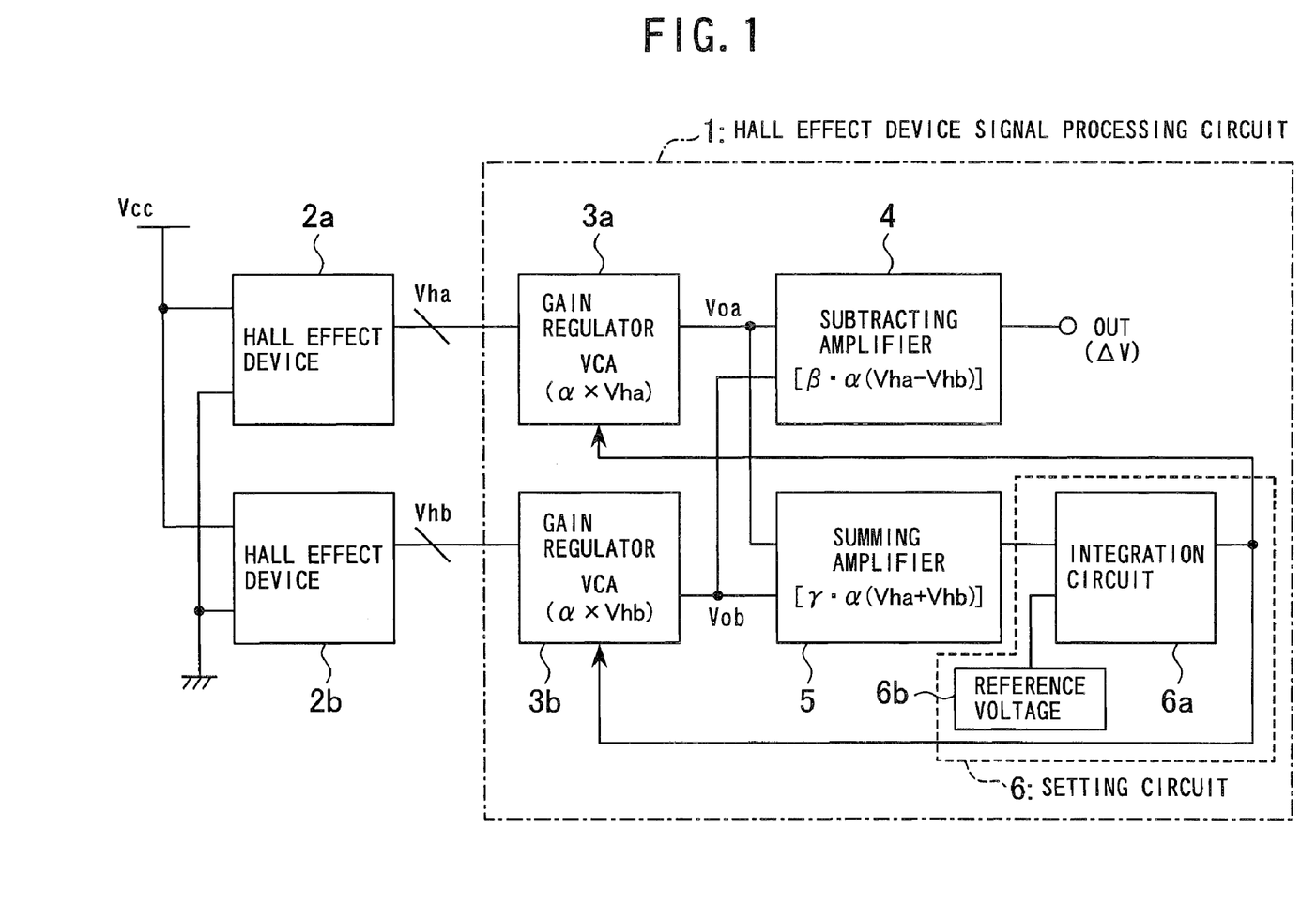
FIG. 1 is a block diagram showing construction of a first embodiment of the position detecting circuit according to the invention.
Figure 2:
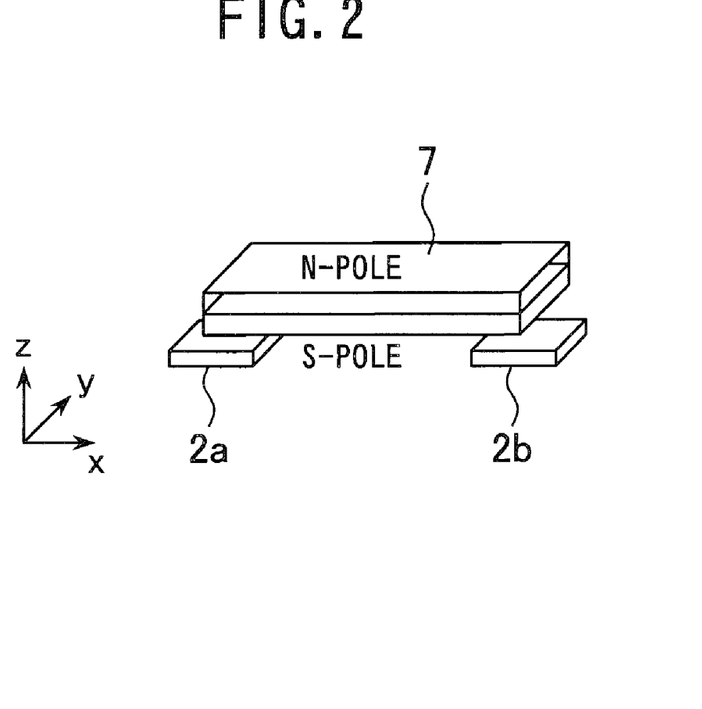
FIG. 2 is a perspective view of a manner of disposition of the components for use in position detection in the first embodiment shown in FIG. 1.
Figure 3:
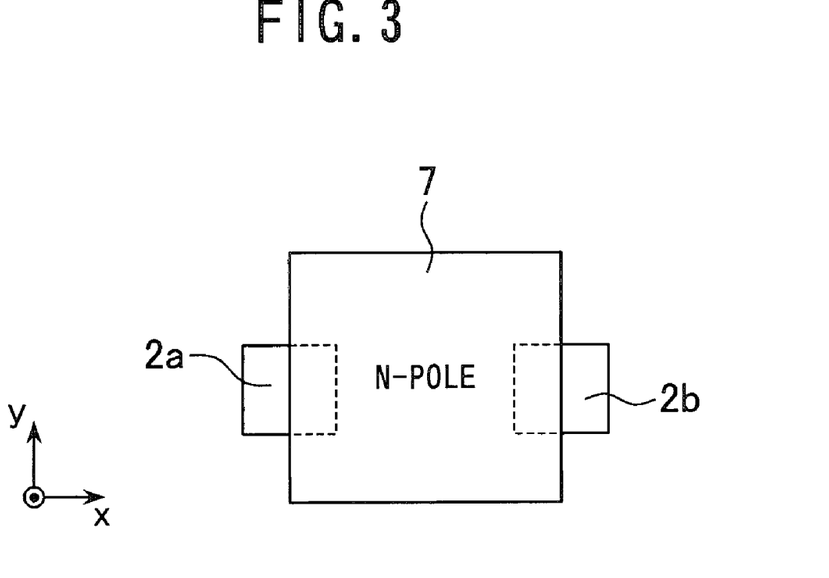
FIG. 3 is a top view of a manner of disposition of the components shown in FIG. 2.

A first embodiment of the position detecting circuit according to the invention will now be described. FIG. 1 is a block diagram showing construction of the position detecting circuit according to the first embodiment; and FIGS. 2 and 3 are a perspective view and top view of physical disposition of the components for use in detecting position. The construction as shown in the figures will now be described. In this embodiment, Hall effect devices 2a, 2b are used as magnetic field detecting device, VCA 3a, 3b as gain regulator, and a rectangular permanent magnet 7 as a magnetic force generating member. As shown in FIG. 1, the position detecting circuit according to this embodiment includes the Hall effect devices 2a, 2b, and a Hall effect device signal processing circuit 1. Further, the Hall effect device signal processing circuit 1 includes the gain regulators (VCA) 3a, 3b, a subtracting amplifier 4, a summing amplifier 5, and a setting circuit 6. The setting circuit 6 includes an integrating circuit 6a, and a reference voltage 6b.

Here, Hall effect devices 2a, 2b are provided as a pair of Hall effect devices that are located discretely in x-axis direction as shown in FIGS. 2 and 3. The permanent magnet 7 is attached in a manner facing the pair of Hall effect devices 2a, 2b so that a center of the permanent magnet 7 is located on an axis passing through the centers of the pair of Hall effect devices 2a, 2b. Here, the center of the permanent magnet 7 refers to the point of at which two diagonal lines of the permanent magnet 7 cross each other on a plane that faces the pair of the Hall effect devices 2a, 2b. Further, an upper face side in z-axis direction of the permanent magnet 7 is magnetized so as to exhibit the polarity of N, and a lower face side in z-axis direction the polarity of S. By a change in circuit design, the disposition of N and S is possible so that the lower face side in z-axis direction is set as N, and the upper face side in z-axis direction as S. The output signals Vha, Vhb of the pair of Hall effect devices 2a, 2b are changed by change in the magnetic field occurring due to movement of the permanent magnet 7.

The gain regulators (VCA) 3a, 3b amplify the output signals Vha, Vhb of the pair of Hall effect devices 2a, 2b to a level multiplied by a gain of the gain regulators (VCA) 3a, 3b, and provide output signals Voa, Vob. The subtracting amplifier 4 amplifies a difference between each output signal Voa, Vob of the gain regulators (VCA) 3a, 3b, to a level multiplied by a gain of the subtracting amplifier 4, and provides it as a position signal $\Delta$V. The summing amplifier 5 outputs sum of the output signals Voa, Vob of the gain regulators (VCA) 3a, 3b with amplifying it to a level multiplied by gain of the summing amplifier 5. To the integrating circuit 6a, the output signal of the summing amplifier 5 and a constant reference voltage 6b set to a predetermined value are inputted so that the integrating circuit 6a integrates the output signal of the summing amplifier 5 on the base of the reference voltage 6b and feeds back the result of integration to the gain regulators (VCA) 3a, 3b.

A description will now be given with respect to operation of the position detecting circuit according to thus constructed first embodiment. The output signals Vha, Vhb of the pair of Hall effect devices 2a, 2b are inputted respectively to the gain regulators (VCA) 3a, 3b. From the gain regulators (VCA) 3a, 3b, output signals Voa=$\alpha$·Vha, Vob=$\alpha$·Vhb obtained by multiplying the output signals Vha, Vhb of the pair of Hall effect devices 2a, 2b by gain a of the gain regulators (VCA) 3a, 3b are outputted to the subtracting amplifier 4 and to the summing amplifier 5. At the subtracting amplifier 4, a difference between output signals Voa, Vob of the gain regulators (VCA) 3a, 3b is amplified by multiplying gain $\beta$ of the subtracting amplifier 4, and $\Delta$V=$\beta$(Voa−Vob)=$\beta$·$\alpha$(Vha−Vhb) is outputted as position signal. At the summing amplifier 5, sum of the output signals Voa, Vob of the gain regulators (VCA) 3a, 3b is amplified by multiplying gain γ of the summing amplifier 5, and γ(Voa+Vob)=γ·α(Vha+Vhb) is outputted to the integrating circuit 6a. The output signal γ(Voa+Vob) of the summing amplifier 5 and the constant reference voltage 6b are inputted to the integrating circuit 6a. The integrating circuit 6a integrates the output signal of the summing amplifier 5 on the base of the reference voltage 6b, and returns the integration signal back to the gain regulators (VCA) 3a, 3b to regulate the gain a of the gain regulators (VCA) 3a, 3b.

More particularly, in regulating gain of the gain regulators (VCA) 3a, 3b, the reference voltage 6b and the output signal of the summing amplifier 5 are compared with each other, and, when the reference voltage 6b is greater, the feedback control is effected so as to increase the gain a of the gain regulators (VCA) 3a, 3b. On the other hand, when the output signal of the summing amplifier 5 is greater than the reference voltage 6b, the feedback control is effected so as to lower the gain a of the gain regulators (VCA) 3a, 3b.

In this manner, the feedback control of gain a of the gain regulators (VCA) 3a, 3b is effected by the output signal of the integrating circuit 6a so that the output signal of the summing amplifier 5 (sum of Voa, Vob) becomes constant. The regulation is thereby possible so as to normalize the output signal ΔV of the subtracting amplifier 4. Accordingly, the output signals of the pair of Hall effect devices 2a, 2b can be outputted as position signal having a favorable linearity.

A description will now be given with respect to the fact that an effect of position detecting error due to individual variance of magnet can be readily suppressed by effecting feedback control so as to make constant the output signal of the summing amplifier 5 and by outputting the output signal of the subtracting amplifier 4 as position signal. Supposing the magnet put to use as "n", the output signals Voa, Vob of the gain regulators (VCA) 3a, 3b when the magnet is located at a predetermined position X may be generally expressed as in the following equations (1), (2).

$$Voa(n)=\alpha(n)\times Vha(n)=\alpha(n)\times\eta(n)\times Va0 \quad (1)$$

$$Vob(n)=\alpha(n)\times Vhb(n)=\alpha(n)\times\eta(n)\times Vb0 \quad (2)$$

where α(n) is gain of the gain regulators (VCA) 3a, 3b, Vha(n), Vhb(n) are output signals of the pair of Hall effect devices 2a, 2b, η(n) is remanent magnetic flux density factor (ratio of remanent magnetic flux density) of the employed magnet to standard magnet, and Va0 Vb0 are output signals of the pair of Hall effect devices 2a, 2b when the standard magnet is located at a predetermined position. It should be noted that, while the output of Hall effect device is a function also variable with position X, such element is omitted here to notice only the effect of individual variance of magnet.

At this time, since the control is effected so as to bring the output signal of the summing amplifier 5 to a constant level, the relationship of output signal of the summing amplifier 5 in using magnet i and magnet j that are different in characteristic of η is expressed as in the following equation (3).

$$Voa(i)+Vob(i)=Voa(j)+Vob(j) \quad (3)$$

Substituting equations (1) and (2) for equation (3), the following equation (4) is obtained by rearrangement.

$$\alpha(i)=\eta(j)/\eta(i)\times\alpha(j) \quad (4)$$

Further, output signals (position signal) ΔV(i), ΔV(j) of the subtracting amplifier 4 when using magnet i and magnet j are expressed as in the following equations (5), (6).

$$\Delta V(i) = \beta\{Voa(i) - Vob(i)\} \quad (5)$$
$$= \beta\times\alpha(i)\times\eta(i)\times(VaO - VbO)$$

$$\Delta V(j) = \beta\{Voa(j) - Vob(j)\} \quad (6)$$
$$= \beta\times\alpha(j)\times\eta(j)\times(VaO - VbO)$$

Substituting (4) for (5), the following equation (7) is obtained by rearrangement.

$$\Delta V(i) = \eta(j)/\eta(i)\times\alpha(j)\times\beta\times\eta(i)\times(VaO - VbO) \quad (7)$$
$$= \beta\times\alpha(j)\times\eta(j)\times(VaO - VbO)$$
$$= \Delta V(j)$$

From the above, according to the present embodiment, the position signal ΔV(i) at the time of using the magnet i and the position signal ΔV(j) at the time of using the magnet j become equal to each other by controlling gain of the gain regulators (VCA) 3a, 3b so as to make constant the output signal of the summing amplifier 5. Accordingly, position detecting error due to individual variance of magnet can be readily suppressed. Further it is seen that, when Voa(n), Vob(n) are treated as function of temperature Voa(t), Vob(t), and the expressions are expanded in a similar manner as the above, the temperature characteristics of the magnet and Hall effect device can also be corrected.

Accordingly, a correction processing can be readily performed to thereby effect position detection at high accuracy without operation for obtaining parameters to correct error due to individual variance of magnet or temperature of Hall effect device and without operation for making a correction according to each individual apparatus.

Figure 4:
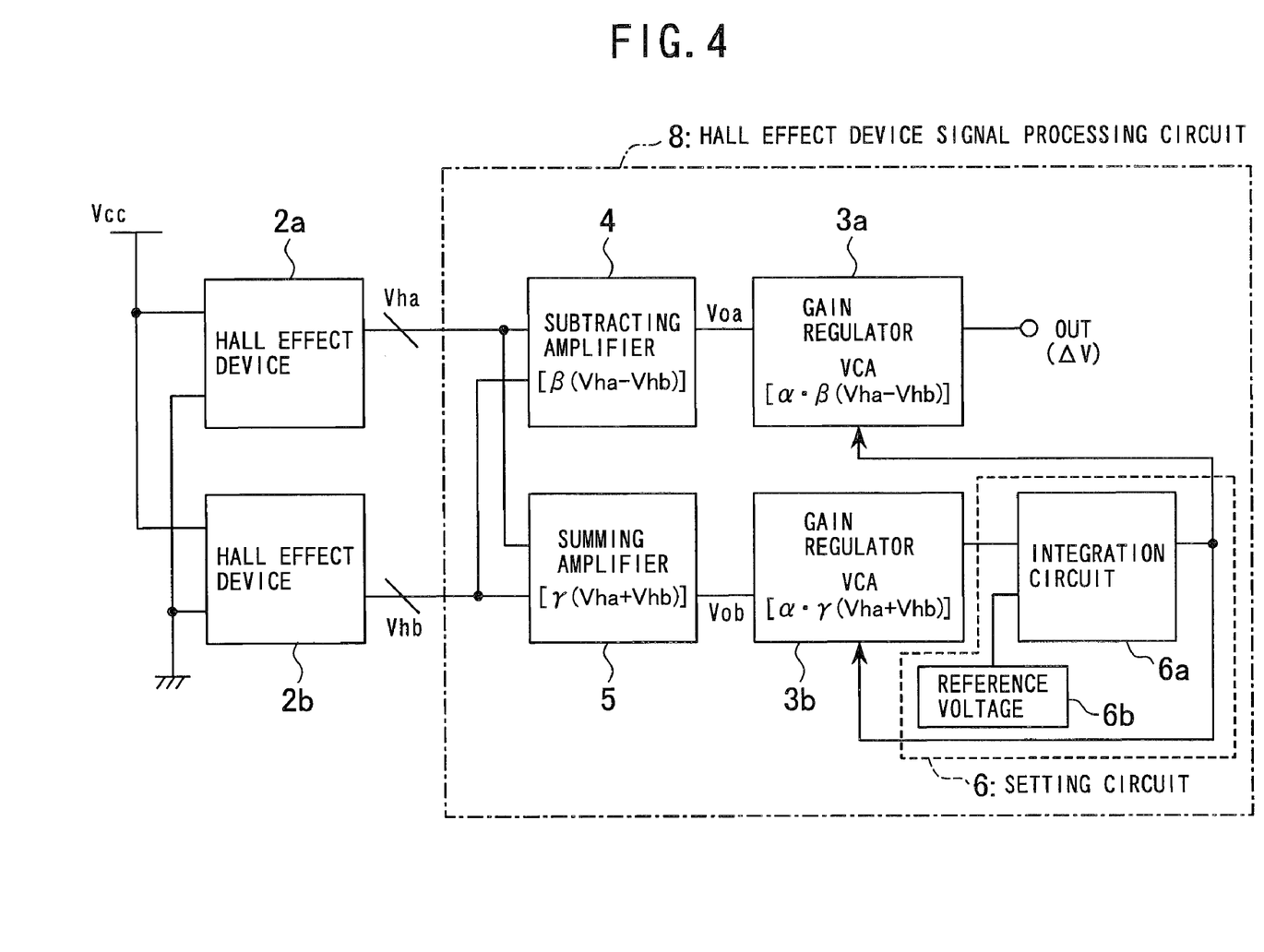
FIG. 4 is a block diagram showing construction of the position detecting circuit according to a second embodiment.

A second embodiment of the invention will now be described. FIG. 4 is a block diagram showing construction of the position detecting circuit according to the present embodiment. Since a pair of Hall effect devices and the components constituting the Hall effect device signal processing circuit used in the second embodiment shown in FIG. 4 are identical to those in the first embodiment shown in FIG. 1, these are denoted by like reference numerals and the explanation will not be described. A description will be given below with respect to operation of the position detecting circuit according to the second embodiment constructed as shown in FIG. 4, mainly of its difference from the first embodiment shown in FIG. 1. It is different from the first embodiment shown in FIG. 1 in that the positions of the subtracting amplifier 4 and the gain regulator (VCA) 3a are interchanged, and the positions of the summing amplifier 5 and the gain regulator (VCA) 3b are interchanged, respectively, in the Hall effect device signal processing circuit 8. In other words, output signals Vha, Vhb of the pair of Hall effect devices 2a, 2b each are inputted to the subtracting amplifier 4 and the summing amplifier 5, and an output signal ΔV=α·β (Vha−Vhb), the output signal of the subtracting amplifier 4 multiplied by gain α of the gain regulator (VCA) 3a, is outputted as position signal. Further, the output signal of the summing amplifier 5 is multiplied by gain α of the gain regulator (VCA) 3b and is outputted to the integrating circuit 6a.

A reference voltage 6b set to a predetermined value is inputted to the integrating circuit 6a, and the output signal of the gain regulator (VCA) 3b is compared with the reference voltage 6*b*. The integrating circuit 6*a* integrates the output signal of the gain regulator (VCA) 3*b* on the base of the reference voltage 6*b*, and, when the reference voltage 6*b* is greater, the feedback control is effected so as to increase gain a of the gain regulators (VCA) 3*a*, 3*b*. On the other hand, when the output signal of the gain regulators (VCA) 3*a*, 3*b* is greater than the reference voltage 6*b*, the feedback control is effected so as to lower the gain a of the gain regulators (VCA) 3*a*, 3*b*.

In this manner, the feedback control of gain $\alpha$ of the gain regulators (VCA) 3*a*, 3*b* is effected so that the output signal of the gain regulator (VCA) 3*b* (sum of Vha, Vhb multiplied by gain) is made constant by the output signal of the integrating circuit 6*a*. The regulation is thereby possible so as to normalize the output signal $\Delta V$ of the gain regulator (VCA) 3*a*. Accordingly, it is thereby possible in a similar manner as the previously described first embodiment to readily perform correction processing and thus to effect position detection at high accuracy without operation for obtaining parameters to correct error due to variance of individual magnet or temperature of Hall effect device and without operation for making a correction according to each individual apparatus. Further, since a feedback route from the integrating circuit 6*a* to the gain regulators (VCA) 3*a*, 3*b* is smaller, the settling time of the position detecting circuit can be made shorter as compared to the first embodiment.

Figure 5:
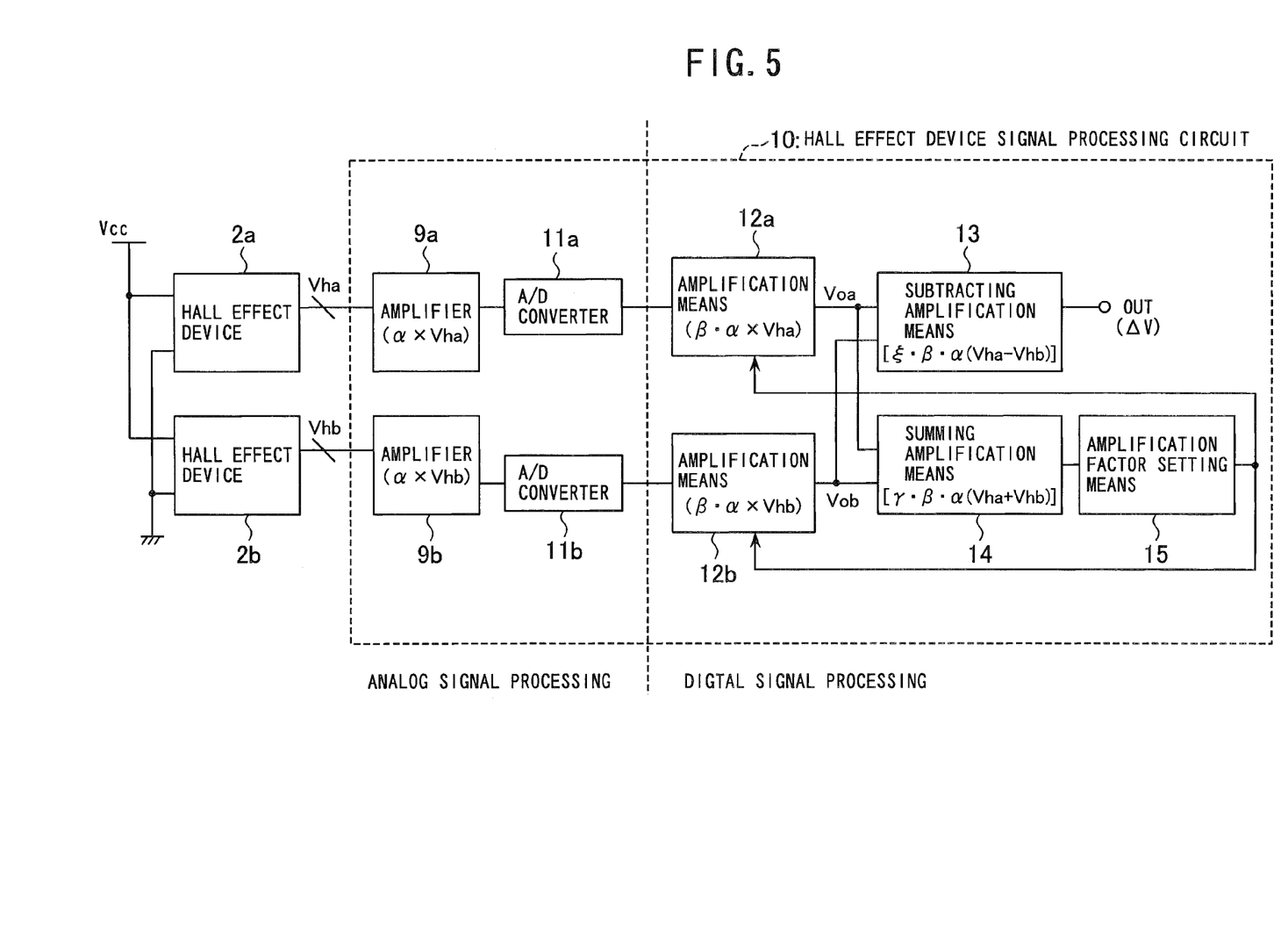
FIG. 5 is a block diagram showing construction of the position detecting circuit according to a third embodiment.

A third embodiment of the invention will now be described. FIG. 5 is a block diagram showing construction of the position detecting circuit according to the present embodiment. Since the construction of a pair of Hall effect devices in FIG. 5 is identical to those of the first and second embodiments shown in FIGS. 1 and 4, these will be denoted by like reference numerals and the explanation will not be described. As shown in FIG. 5, the position detecting circuit according to this embodiment includes a pair of Hall effect devices 2*a*, 2*b*, and a Hall effect device signal processing circuit 10. The Hall effect device signal processing circuit 10 includes amplifiers 9*a*, 9*b*, A/D converters 11*a*, 11*b*, amplification means 12*a*, 12*b*, a subtracting amplification means 13, a summing amplification means 14, and an amplification factor setting means 15.

An operation of the position detecting circuit according to the third embodiment having such construction will now be described. The output signals Vha, Vhb of the pair of Hall effect devices 2*a*, 2*b* each are inputted respectively to the amplifiers 9*a*, 9*b*. The amplifiers 9*a*, 9*b* output signals Voa=$\alpha$·Vha, and Vob=$\alpha$·Vhb, i.e. the output signals Vha, Vhb multiplied by gain $\alpha$ of the amplifiers 9*a*, 9*b*, to the A/D converters 11*a*, 11*b*. The output signals are then converted into digital signals by the A/D converters 11*a*, 11*b*. The converted digital signals are subjected to signal processing in a similar manner as the first embodiment through the amplification means 12*a*, 12*b*, subtracting amplification means 13, summing amplification means 14, and amplification factor setting means 15 to generate a position signal $\Delta V$. Here, a gain of the amplification means 12*a*, 12*b* is set as $\beta$, a gain of the subtracting amplification means 13 as $\xi$, and a gain of the summing amplification means 14 as $\gamma$. In other words, the amplification means 12*a*, 12*b* in FIG. 5 performs processing corresponding to the gain regulators (VCA) 3*a*, 3*b* shown in FIG. 1; the subtracting amplification means 13 in FIG. 5 performs processing corresponding to the subtracting amplifier 4 shown in FIG. 1; the summing amplification means 14 in FIG. 5 performs processing corresponding to the summing amplifier 5 shown in FIG. 1; and the amplification factor setting means 15 in FIG. 5 performs processing corresponding to the integrating circuit 6*a* and reference voltage 6*b* shown in FIG. 1.

Similarly to the previously described first embodiment, thus, the gain of the amplification means 12*a*, 12*b* is subjected to a feedback control so that output signal (sum of Voa, Vob) of the summing amplification means 14 is made constant by the output signal of the amplification factor setting means 15. It is thereby possible to perform an operation processing so as to normalize output signal (position signal) $\Delta V$ of the subtracting amplification means 13. Accordingly, in a similar manner as the first and second embodiments, it is possible to readily perform the correction processing and thereby to effect the position detection at high accuracy without operation for obtaining parameters to correct error due to variance of individual magnet or temperature of Hall effect device and without operation for making a correction according to each individual apparatus. Further, the processing at and after the amplification means 12*a*, 12*b* is of digital signal. Since on and after of the amplification means 12*a* and 12*b* in the Hall effect device signal processing circuit can thus be formed of a so-called microcomputer, the size of the position detecting circuit can be made smaller as compared to the first and second embodiments.

Figure 6:
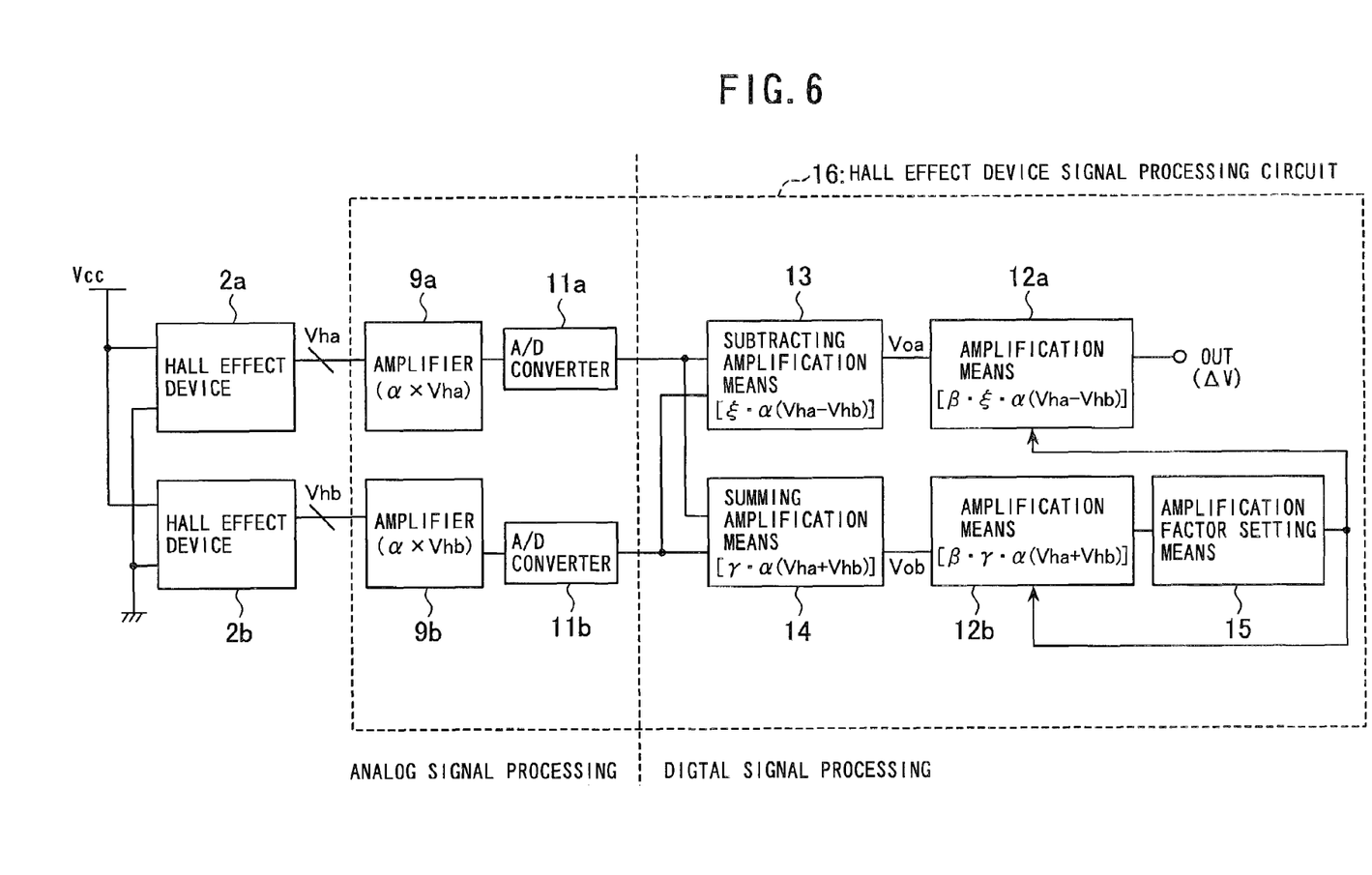
FIG. 6 is a block diagram showing construction of the position detecting circuit according to a fourth embodiment.

A fourth embodiment of the invention will now be described. FIG. 6 is a block diagram showing construction of the position detecting circuit according to the present embodiment. Since a pair of Hall effect devices and the components constituting the Hall effect device signal processing circuit put to use in FIG. 6 are of the same construction as the third embodiment shown in FIG. 5, these are denoted by like reference numerals and the explanation will not be described. A description will be given below with respect to operation of the position detecting circuit according to the fourth embodiment constructed as shown in FIG. 6, mainly of its difference from the third embodiment shown in FIG. 5. It is different from the third embodiment shown in FIG. 5 in that the positions of the subtracting amplification means 13 and the amplification means 12*a* are interchanged, and the positions of the summing amplification means 14 and the amplification means 12*b* are interchanged, respectively, in the Hall effect device signal processing circuit 16. In other words, the digital signals converted by the A/D converters 11*a*, 11*b* are subjected to signal processing similarly to the second embodiment through the amplification means 12*a*, 12*b*, subtracting amplification means 13, summing amplification means 14, and amplification factor setting means 15 to generate the position signal $\Delta V$. At this time, the amplification means 12*a*, 12*b* in FIG. 6 perform the processing corresponding to the gain regulators (VCA) 3*a*, 3*b* shown in FIG. 4; the subtracting amplification means 13 in FIG. 6 performs the processing corresponding to the subtracting amplifier 4 shown in FIG. 4; the summing amplification means 14 in FIG. 6 performs the processing corresponding to the summing amplifier 5 shown in FIG. 4; and the amplification factor setting means 15 in FIG. 6 performs the processing corresponding to the integrating circuit 6*a* and reference voltage 6*b* shown in FIG. 4.

Accordingly, in a similar manner as the previously described second embodiment shown in FIG. 4, the feedback control of gain $\beta$ of the amplification means 12*a*, 12*b* is effected so that the output signal of the amplification means 12*b* (sum of Vha, Vhb multiplied by gain) is made constant by the output signal of the amplification factor setting means 15. The regulation is thereby possible so as to normalize the output signal (position signal) $\Delta V$ of the amplification means 12*a*. Accordingly, it is possible in a similar manner as the first to third embodiments to readily perform the correction processing and to thereby effect the position detection at high accuracy without operation for obtaining parameters to correct error due to variance of individual magnet or temperature of Hall effect device and without operation for making a correction according to each individual apparatus. Further, since a feedback route from the amplification factor setting means 15 to the amplification means 12a, 12b is made smaller so as to make an operation size smaller, a settling time of the position detecting circuit can be made shorter as compared to the third embodiment.

Figure 7:
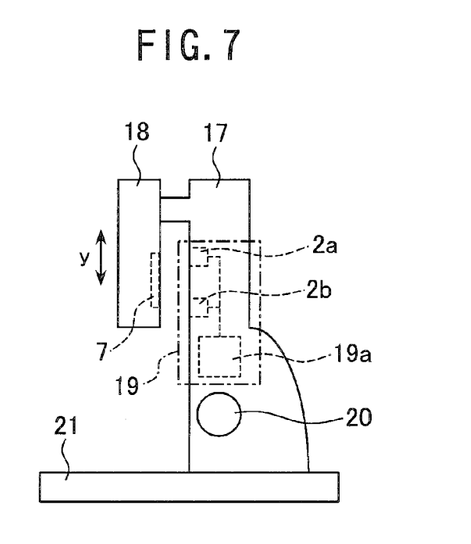
FIG. 7 schematically shows construction of a microscope having the position detecting circuit according to a fifth embodiment.

A fifth embodiment of the invention will now be described. In the fifth embodiment, the case where the position detecting circuit according to the invention is put to use in detecting one-dimensional position will be described by way of a microscope as an example of actual mode of use. FIG. 7 shows a microscope having the position detecting circuit according to the invention. Its construction will now be described by way of FIG. 7. As shown in FIG. 7, the microscope includes a pair of Hall effect devices 2a, 2a permanent magnet 7, a support arm 17, a lens barrel 18 for retaining objectives, a Hall effect device signal processing circuit 19a, a height adjusting section 20, and stage 21. The lens barrel 18 internally holds the permanent magnet 7, while the support arm 17 internally holds the pair of Hall effect devices 2a, 2b, and the Hall effect device signal processing circuit 19a.

Here, the pair of Hall effect devices 2a, 2b are located discretely in y-axis direction as shown in FIG. 7, and the permanent magnet 7 is attached in a manner facing the pair of Hall effect devices 2a, 2b so that a center of the permanent magnet 7 is located on an axis passing through the centers of the pair of Hall effect devices 2a, 2b. Here, the center of the permanent magnet 7 refers to the point at which two diagonal lines of the permanent magnet 7 cross each other on a plane that faces the pair of the Hall effect devices 2a, 2b. Further, the pair of Hall effect devices 2a, 2b are connected to the Hall effect device signal processing circuit 19a so that the pair of Hall effect devices 2a, 2b and Hall effect device signal processing circuit 19a constitute a position detecting circuit 19. The position detecting circuit 19 then includes a position detecting circuit of the construction of one of those shown in the first to fourth embodiments of the invention. The position of the lens barrel 18 is movable within a predetermined range in y-axis (height) direction by controlling the height adjusting section 20.

A description will now be given with respect to operation for detecting the position of the lens barrel 18 of the microscope having such construction. When height of the lens barrel 18 is changed by an adjustment of the height adjusting section 20, a relative position between the permanent magnet 7 and the pair of Hall effect devices 2a, 2b is changed. The pair of Hall effect devices 2a, 2b output voltages corresponding to change in relative position with the permanent magnet 7 to the Hall effect device signal processing circuit 19a. The Hall effect device signal processing circuit 19a performs the signal processing in the position detecting circuit of the construction of one of those shown in the first to fourth embodiments to obtain a position information in y-axis direction of the lens barrel 18.

Accordingly, with the microscope having such position detecting circuit, it is possible similarly to those of the above described construction shown in the first to fourth embodiments to obtain the position information of the lens barrel 18 at high accuracy without performing operation for obtaining parameters to correct error due to individual variance of magnet or to temperature of Hall effect device and/or operation for making a correction according to each individual apparatus. It should be noted that the microscope in FIG. 7 has been shown as having the permanent magnet 7 at the interior of the lens barrel 18 and having the pair of Hall effect devices 2a, 2b and the Hall effect device signal processing circuit 19a at the interior of the support arm 17. It is however also possible to have the pair of Hall effect devices 2a, 2b and the Hall effect device signal processing circuit 19a at the interior of the lens barrel 18, and the permanent magnet 7 at the interior of the support arm 17.

Figure 8:
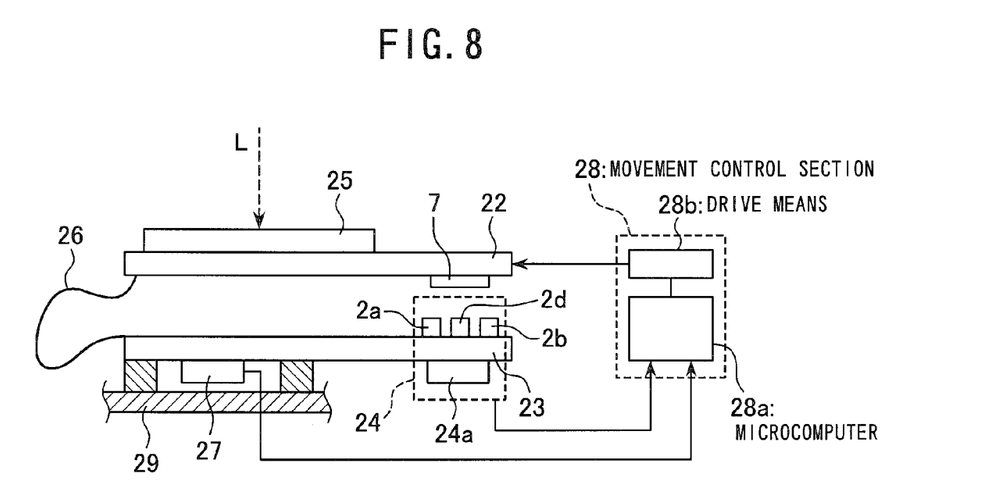
FIG. 8 is a side view schematically showing construction of a shake correction apparatus having the position detecting circuit according to a sixth embodiment.
Figure 9:
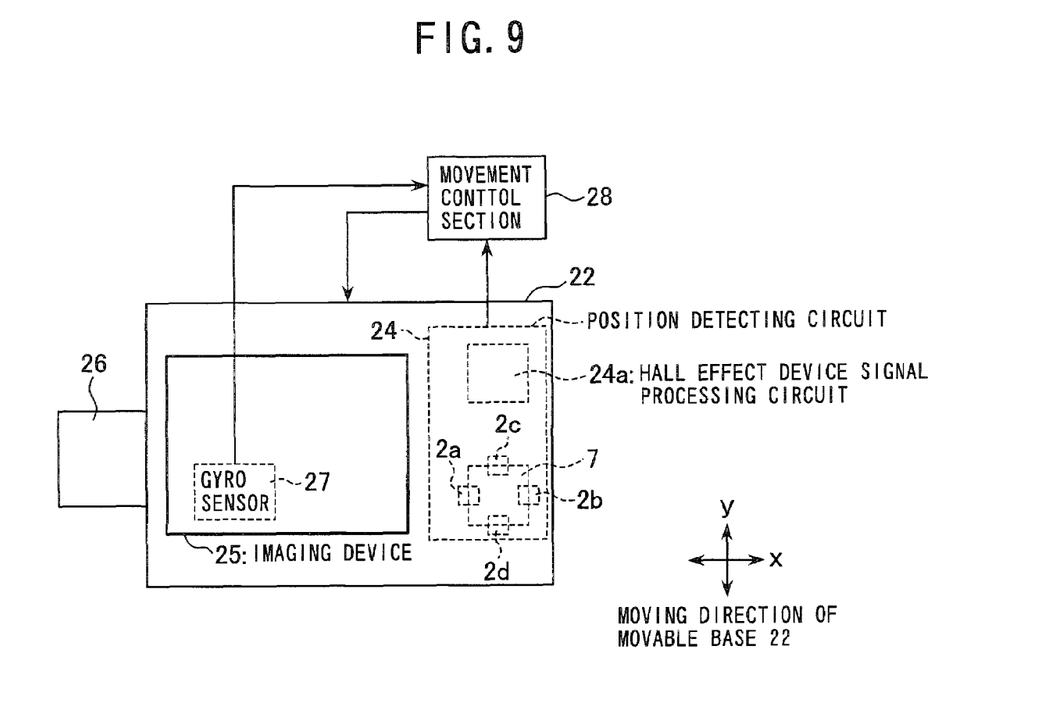
FIG. 9 is a top view of the shake correction apparatus shown in FIG. 8.

A sixth embodiment of the invention will now be described. In the sixth embodiment, the case where the position detecting circuit according to the invention is put to use in detecting two-dimensional position will be described by way of a shake correction apparatus of digital still camera as an example of actual mode of use. FIGS. 8 and 9 are a side view and a top view showing the shake correction apparatus using the position detecting circuit according to the invention. Its construction will now be described by way of FIGS. 8 and 9. As shown in FIGS. 8 and 9, the shake correction apparatus includes: four Hall effect devices, or in other words two pairs of Hall effect devices consisting of a pair of Hall effect devices 2a, 2b, and another pair of Hall effect devices 2c, 2d; a permanent magnet 7; a movable base 22; a fixed base 23; a Hall effect device signal processing circuit 24a; an imaging device 25; a flexible substrate 26; a gyro sensor 27; and a movement control section 28.

The movable base 22 is attached so as to be movable with respect to a main body 29 of the digital still camera, and has the imaging device 25 and the permanent magnet 7. The imaging device 25 is for converting an incident object image into an electrical signal, which is attached to the movable base 22 on the side from which an incident light L enters so as to form the image on the imaging plane of the imaging device 25. The permanent magnet 7 is attached to the movable base 22 with a separation from the imaging device 25 on a side reverse to the side to which the imaging apparatus 25 is attached. The movable base 22 is capable of parallel displacement in x-axis and y-axis directions by drive of a drive means 28b such as motor of the movement control section 24

On the other hand, the fixed base 23 is fixed to the main body 29, and has the two pairs of Hall effect devices (2a, 2b and 2c, 2d), Hall effect device signal processing circuit 24a, and gyro sensor 27. Of the two pairs of Hall effect devices, one pair of Hall effect devices 2a, 2b are located discretely in x-axis direction, and the other pair of Hall effect devices 2c, 2d are located discretely in y-axis direction. Further, the two pairs of Hall effect devices are attached in a manner facing the permanent magnet 7 so that they are orthogonal at the middle point of distance of one pair of Hall effect devices 2a, 2b and the middle point of distance of the other pair of Hall effect devices 2c, 2d, and that a center of the permanent magnet 7 is located on the axial line passing through these middle points. Here, the center of the permanent magnet 7 refers to the point at which two diagonal lines of the permanent magnet 7 cross each other on a plane of the permanent magnet 7 facing the two pairs of Hall effect devices.

The one pair of Hall effect devices 2a, 2b are to obtain position information in x-axis direction of the movable base 22, and the other pair of Hall effect devices 2c, 2d are to obtain position information in y-axis direction of the movable base 22. The Hall effect signal processing circuit 24a is attached in the vicinity of the two pairs of Hall effect devices onto a face reverse to the face of the fixed base 23 on which the two pairs of Hall effect devices are attached, and it is formed into a connection within the fixed base 23 so as to constitute the position detecting circuit 24. Further, as the Hall effect device signal processing circuit 24a, two sets (one for x-axis direction and the other for y-axis direction) of Hall effect device signal processing circuits of the position detecting circuit of the construction of one of those shown in the first to fourth embodiments are provided to perform the signal processing of the two pairs of Hall effect devices.

The gyro sensor 27 is attached on the same face of the fixed base 23 to which the Hall effect device signal processing circuit 24*a* is attached, and the outputs of the gyro sensor 27 and the Hall effect device signal processing circuit 24*a* are connected to a microcomputer 28*a* of the movement control section 28. The movable base 22 and the fixed base 23 are connected to each other through a flexible substrate 26 so that they are capable of transmitting/receiving a signal to/from a circuit (not shown) for processing the output signals of the imaging device 25.

An operation of the shake correction apparatus having such construction will now be described. When a vibration (shake) occurs of the camera body internally having the shake correction apparatus, the gyro sensor 27 detects angular velocities about x-axis and about y-axis, and outputs then angular velocity signals to the microcomputer 28*a*. At this time, the position detecting circuit 24 obtains and outputs to the microcomputer 28*a* the position information with respect to x-axis and y-axis of the movable base 22 (imaging device 25).

The microcomputer 28*a* computes a moving amount (amount of shake) and a moving velocity (velocity of shake) of image due to the shake on the imaging device 25 from the angular velocity signals of the gyro sensor 27. The computed shake amount and a current position information of the movable base 22 (imaging device 25) are then used to determine a voltage to be applied to the drive means 28*b* such as a motor to move (correct) the movable base 22 (imaging device 25) at a velocity following the shake velocity toward the direction along which the generated shake amount is suppressed. In other words, the microcomputer 28*a* compares the current position information of the movable base 22 (imaging device 25) inputted from the position detecting circuit 24 with the position toward which the movable base 22 (imaging device 25) is to be corrected so as to suppress the occurred shake, and effects a feedback control so that the movable base 22 (imaging device 25) is moved to the position to be corrected.

For example, as a result of performing the shake correction and detecting the position of the imaging device 25 by the position detecting circuit 24, if the position of the imaging device 25 went too far in relation to the position to which it is to be corrected, the moving amount of the imaging device 25 is adjusted toward the direction of returning to the position to be corrected based on the output signal of the position detecting circuit 24 so as to move the imaging device 25 to the position to be corrected. Similarly, if the movement of the imaging device 25 is too small in relation to the position to be corrected as a result of detecting the position of the imaging device 25 by the position detecting circuit 24, the moving amount of the imaging device 25 is adjusted toward the direction of approaching the position to be corrected based on the output signal of the position detecting circuit 24 so as to move the imaging device 25 to the position to which it is to be corrected.

Accordingly, with the shake correction apparatus having such construction, similarly to those shown in the previously described first to fourth embodiments, it is possible to detect the position of the movable base (imaging device) at high accuracy and thus to readily perform the shake correction at high accuracy without operation for obtaining parameters to correct error due to individual variance of magnet or temperature of Hall effect device and without operation for making correction according to each individual apparatus. It should be noted that, while the present embodiment has been described with respect to the mode where the shake correction is performed with moving the imaging device 25 together with the movable base 22, it is also possible to fix the imaging device 25 and to perform the shake correction with moving a correction lens.

Further, while the present embodiment has been described by way of a digital still camera for taking a still image as an example, a similar advantage is obtained also when it is used in imaging equipment for taking moving image (video camera, digital video camera, etc.). Further, while the present embodiment has described of the construction where the two pairs of Hall effect devices are located on the fixed base 23 and the permanent magnet 7 on the movable base 22, the positions of the two pairs of Hall effect devices and of the permanent magnet 7 may be interchanged. In particular, a similar advantage is obtained also with the construction where the two pairs of Hall effect devices are located on the movable base 22, and the permanent magnet 7 on the fixed base 23.

Further, while the above embodiments have been described with respect to the position detecting circuit that is constructed with using Hall effect devices as a magnetic sensor, magnetic sensors applicable to the present invention include but not limited to Hall effect devices. Specifically, a similar advantage can be obtained also when those devices such as MI sensor, magnetic resonance type magnetic field detecting device, MR device, etc. capable of obtaining position information of the movable base by detecting change in magnetic field are used as the magnetic sensor.

As has been described by way of the above embodiments, according to the first to fourth aspects of the invention, an effect of position detection error due to individual variance and temperature characteristic of the magnetic field detecting device can be readily suppressed so that an accuracy in detecting position is improved. Further, since correction of each individual magnetic field detecting device is unnecessary, the work and time required in the correcting operation can be reduced. According to the fifth aspect, an effect of position detection error due to individual variance and temperature characteristic of the magnetic field detecting device can be readily suppressed so that the position of a lens barrel can be readily detected at high accuracy. According to the sixth aspect, since an effect of position detection error due to individual variance and temperature characteristic of the magnetic field detecting device can be readily suppressed so as to detect position of the imaging device at high accuracy, the correction of shake can be readily performed at high accuracy.

What is claimed is:

1. A position detecting circuit comprising:
   a plurality of magnetic field detecting devices discretely disposed for outputting a signal corresponding to a magnetic field strength produced by an oppositely disposed magnetic field generation means; and
   a signal processing circuit having a plurality of input terminals electrically connected to the plurality of magnetic field detecting devices,
   wherein the signal processing circuit comprising:
   a correction parameter arithmetic section for computing correction parameters for bringing to a predetermined constant value a sum of an output from one of said magnetic field detecting devices and an output from another of said magnetic field detecting devices; and
   a position arithmetic section for computing and outputting a relative position between said magnetic field generation means and said magnetic field detecting devices based on an output difference between the output from said one magnetic field detecting device and the output from said another magnetic field detecting device and said correction parameters, and wherein the position arithmetic section comprises a first gain regulator and a second gain regulator whose gains are controlled by said correction parameters.

2. The position detecting circuit according to claim 1, wherein the first gain regulator applies a gain corresponding to said correction parameters to the output from said one magnetic field detecting device, wherein the second gain regulator applies said gain corresponding to said correction parameters to the output from said another magnetic field detecting device, wherein said position arithmetic section further comprises a subtracting amplifier for computing a difference between each output of said first and said second gain regulators and outputting it as a signal representing said relative position, and wherein said correction parameter arithmetic section computes said correction parameters so as to bring a sum of the outputs from each of said first and said second gain regulators to the predetermined constant value.

3. The position detecting circuit according to claim 1, wherein said position arithmetic section comprises a subtracting amplifier for computing said output difference, and a gain regulator for applying a gain corresponding to said correction parameters to an output from said subtracting amplifier.

4. The position detecting circuit according to claim 1 further comprising A/D converter for converting each output from said one and the another magnetic field detecting devices respectively into digital signals, wherein said position arithmetic section and the correction parameter arithmetic section respectively execute an arithmetic operation on an output from the A/D converter.

5. The position detecting circuit according to claim 1, wherein the gain regulator is used for computing the correction parameter.

6. A microscope comprising:

a lens barrel for retaining objective lens;

a support arm for supporting said lens barrel so as to be movable;

a regulating section for regulating a position of said lens barrel in relation to said support arm;

a magnetic field generation means for generating a magnetic field attached to one of said lens barrel or said support arm; and the position detecting circuit according to claim 1 disposed on a side face of the other of said lens barrel or said support arm opposite said magnetic field generation means.

7. A shake correction apparatus of an imaging apparatus comprising:

a movable retaining section for retaining one or the other of a taking lens or an imaging device for converting an object image entered through said taking lens into electrical signals in a manner movable in relation to a main body of said imaging apparatus;

a magnetic field generation means for generating a magnetic field attached to one of said movable retaining section or a member fixed to said main body;

the position detecting circuit according to claim 1 disposed on a side face of the other of said movable retaining section or the member fixed to said main body opposite said magnetic field generation means;

a shake amount measuring means for measuring an amount of shake of said main body; and a movement control means for moving said movable retaining section so as to compensate for said amount of shake based on an output from said position arithmetic section.

* * * * *